(12) United States Patent
Mansberger

(10) Patent No.: US 9,926,906 B2
(45) Date of Patent: Mar. 27, 2018

(54) THERMODYNAMIC WIND TURBINE

(71) Applicant: Larry Lee Mansberger, Fort Worth, TX (US)

(72) Inventor: Larry Lee Mansberger, Fort Worth, TX (US)

(73) Assignee: Mansberger Aircraft Inc., Fort Worth, TX (US)

( * ) Notice: Subject to any disclaimer, the term of this patent is extended or adjusted under 35 U.S.C. 154(b) by 54 days.

(21) Appl. No.: 15/143,041

(22) Filed: Apr. 29, 2016

(65) Prior Publication Data

US 2017/0314529 A1     Nov. 2, 2017

(51) Int. Cl.
*F03D 1/06* (2006.01)
*F03D 9/00* (2016.01)
*F03D 1/04* (2006.01)

(52) U.S. Cl.
CPC .......... *F03D 1/0625* (2013.01); *F03D 9/002* (2013.01); *F03D 1/04* (2013.01); *F05B 2220/30* (2013.01); *F05B 2240/13* (2013.01); *F05B 2240/221* (2013.01); *Y02E 10/721* (2013.01)

(58) Field of Classification Search
CPC .......... F03D 1/0625; F03D 9/002; F03D 1/04; F05B 2240/221; F05B 2220/30; F05B 2240/13; Y02E 10/721
See application file for complete search history.

(56) References Cited

U.S. PATENT DOCUMENTS

| | | | |
|---|---|---|---|
| 4,075,500 A | 2/1978 | Oman et al. | |
| 4,482,290 A | 11/1984 | Foreman et al. | |
| 4,720,640 A * | 1/1988 | Anderson | F03B 13/083 290/43 |
| 6,786,697 B2 | 9/2004 | O'Connor et al. | |
| 7,214,029 B2 * | 5/2007 | Richter | F03D 1/025 415/193 |
| 7,218,011 B2 | 5/2007 | Hiel et al. | |
| 7,550,864 B2 | 6/2009 | Anderson et al. | |
| 7,874,788 B2 * | 1/2011 | Stothers | F03B 3/04 415/148 |
| 7,904,978 B2 | 6/2011 | Weissmann | |
| 7,976,268 B2 * | 7/2011 | Presz, Jr. | F03D 1/04 415/211.2 |

(Continued)

OTHER PUBLICATIONS

Mansberger, Larry L., "A Fundamental Revision of Wind Turbine Design Theory Mansberger Blade Element Theory: M-BET", 2015, http://mansbergeraircraft.com/A%20Fundamental%20Revision%20of%20Wind%20Turbine%20Design%20Theory.pdf.

(Continued)

*Primary Examiner* — Michael C Zarroli

(57) ABSTRACT

The invention discloses versions of a horizontal axis wind turbine and methodologies for the design of wind turbines, which are capable of extracting both kinetic and thermal energy from the wind. The wind turbines disclosed use a large diameter forward inlet fairing to accelerate the airflow to the more effective outer radii of the turbine rotor where the airflow is constrained by an airfoil-shaped flow control ring. This serves to prevent rotor tip losses, to inhibit wake expansion, and to accelerate the airflow through the turbine. A similarly large diameter aft pressure recovery fairing promotes rotation and contraction of the wake downstream of the turbine. Further methodologies for optimization and an algorithm for detail design are disclosed.

4 Claims, 7 Drawing Sheets

(56) References Cited

U.S. PATENT DOCUMENTS

| | | | |
|---|---|---|---|
| 7,980,811 B2 | 7/2011 | Presz, Jr. et al. | |
| 8,226,348 B2 | 7/2012 | Scerbina | |
| 8,287,243 B2 | 10/2012 | Herr et al. | |
| 8,596,978 B2* | 12/2013 | Garmong | F03D 1/0658 416/132 B |
| 8,616,829 B2* | 12/2013 | Becker | F03B 3/04 290/43 |
| 8,672,624 B2 | 3/2014 | Brock | |
| 8,829,706 B1* | 9/2014 | Sammy | F03D 1/025 244/207 |
| 9,194,362 B2* | 11/2015 | Merlini, III | F03D 1/04 |
| 9,261,073 B2* | 2/2016 | Blake | F03D 1/025 |
| 9,512,817 B2* | 12/2016 | Wood | F03D 1/025 |
| 2003/0223858 A1* | 12/2003 | O'Connor | F03D 1/04 415/4.1 |
| 2010/0111697 A1* | 5/2010 | Wood | F01D 1/24 416/128 |
| 2010/0181775 A1* | 7/2010 | Yu | F03D 1/04 290/55 |
| 2015/0260155 A1* | 9/2015 | Ridings | F03D 1/04 415/1 |
| 2015/0322919 A1* | 11/2015 | Acosta-Nassar | F03D 80/82 416/9 |

OTHER PUBLICATIONS

Mansberger, Larry L., "Corrected Momentum and Energy Equations Disprove Betz's Limit", 2015, http://mansbergeraircraft.com/Corrected%20Momentum%20and%20Energy%20Equations%20Disprove%20Betz's%20Limit.pdf.

Mansberger, Larry L., "Thermodynamic Wind Turbine Model Addendum", 2016, http://mansbergeraircraft.com/Thermodynamic%20Wind%20Turbine%20Model%20Addendum.pdf.

Hansen, Martin O.L., "Shrouded Rotors", Aerodynamics of Wind Turbines, 2007, pp. 41-55, 2nd Edition, Earthscan Routledge, London, UK and Sterling, VA U.S.A.

Manwell J.F., McGowan, and Rogers, "Aerodynamics of Wind Turbines", Wind Energy Explained: Theory, Design, and Application 2009, pp. 83-138, John Wiley & Sons, Ltd., West Sussex, UK.

Jamieson, Peter, "Rotor Aerodynamic Theory", Innovation in Wind Turbine Design, 2011, pp. 11-43, 1st Edition, John Wiley & Sons, Ltd., West Sussex, UK.

* cited by examiner

THERMODYNAMIC WIND TURBINE

BACKGROUND OF THE INVENTION

The invention relates to the field of wind power engineering and in particular to horizontal axis wind turbine design. Modern wind turbine power output has been increasing with the use of faster turning, larger diameter rotors on higher towers, all pushing the limits of practical manufacturing, transportation and construction. At the same time, the potential for smaller distributed energy sources beckons for new and better solutions. However, in almost a century, little has changed within the theory, formulas or algorithms used to design and optimize wind turbine configurations.

A detailed study within the technical literature available on the subject of wind turbine design reveals that most wind turbine design and optimization is based on $19^{th}$ century Froude's actuator disc momentum theory. Froude's actuator disc theory uses an incorrect solution to the momentum equation to derive results that diverge from the characteristics of real airflow. The primary result of Froude's momentum theory is that the velocity through the turbine is said to be equal to the average of the free stream and final velocity of the wake. This is an impossibility as the result implies that when the velocity through the turbine is slowed to one half of the free stream velocity then the resulting velocity far downstream would have to equal zero. This implies an infinite expansion of the wake for these conditions. So in fact, this historic momentum theory is both inaccurate and invalid for use in understanding the flow through a wind turbine.

Furthermore, the conventional theories incorrectly make use of Bernoulli's equation to compare the pressure differential across the wind turbine to the loss in kinetic energy of the final airflow. Bernoulli's equation is an over-simplification of the energy equation that assumes a steady flow of an incompressible fluid at a constant temperature. The change in energy that occurs at the rotor of the wind turbine is a shift from internal thermal and pressure energies to rotational kinetic energies and cannot be handled by Bernoulli's equation. The only way to analyze this exchange accurately is by using the total energy equation including the enthalpy terms relating pressure and temperature. This combination of incorrect solution to the momentum equation and misuse of Bernoulli's equation results in the derivation of the Lanchester, Joukowsky, and Betz limit, which incorrectly claims that only 59.3% of the relative value of kinetic energy can be extracted from the airflow.

Wind turbine design also is based on the early $20^{th}$ century work of Hermann Glauert and others working on aircraft propeller and rotorcraft design theory. Their work resulted in what is known as blade-element momentum theory, which is fundamentally used still today. However, the purpose of a propeller is fundamentally different from a wind turbine. A propeller must convert shaft power into thrust. If the propeller also causes the slipstream to rotate, then this is correctly considered an inefficiency. The purpose of a wind turbine is to convert thrust into shaft power. It has been a common misconception that if the wind turbine causes the slipstream to rotate that this too is a similar inefficiency. Nevertheless, this rotation is also a necessity unless the turbine uses stator vanes, which is not the case. A rotating wind turbine cannot extract power from the wind unless it imparts an equal and opposite torque into the slipstream and therefore causes the slipstream to rotate. The Glauert method of accounting for rotation incorrectly assumes that the slipstream rotation is directly proportional to turbine rotation, as it is with a propeller. However for a wind turbine, the slipstream rotation is in the opposite direction and inversely proportional to the turbine rotation. None of the current methods available have properly accounted for the effect of these rotational parameters within the corrected energy equation.

Furthermore, conventional methods often and incorrectly relate the thrust force times velocity as equal to the power extracted; however, those methods fail to account for the condition of a free spinning rotor or propeller. When a rotor or propeller is free spinning with no torque applied to its connecting shaft, it is still creating a very significant negative thrust but with no power exchange other than frictional losses. This fact should dismiss the assumption that thrust times velocity equates to power out, which is a basis of many conventional theories.

Other design trends in horizontal axis wind turbines include ducted, shrouded, and diffuser augmented turbines, all of which can be referred to as constrained flow rotors. Although these constrained flow rotors show promise, their commercial success has yet to be realized; their basic designs still rely on the same theories as the open rotors and these current theories improperly reward diffuser designs and incorrectly discourage highly loaded multi-bladed wind turbines.

In fact, the historical theoretical basis of wind turbine design has become ingrained with assumptions, mistakes, and misconceptions. The consequence of these historical errors is that the importance of the rotational factors have been neglected and the modern wind turbine design has been improperly skewed towards the conventional three-bladed wind turbines that we see in the field today. The conception for the thermodynamic wind turbine presented here came as a result of the desire to correct the aforementioned flaws within the conventional wind turbine design theories.

BRIEF SUMMARY OF THE INVENTION

New solutions for momentum and energy equations were derived which align better with natural observations and empirical data. Using these new solutions, a thermodynamic mathematical model was developed for a better understanding of the airflow, wake profile, energy extraction, and implications of alternative design parameters. This led to new fundamental relationships that are used in the design of the thermodynamically active wind turbine.

The invention embodies higher efficiency versions of a horizontal axis wind turbine and new fundamental methodologies for the design of wind turbines, which extract both kinetic and thermal energy from the wind. The new design is based on a fundamental revision of wind turbine design theory. The premise of this new theory is that as the airflow passes through a conventional horizontal axis wind turbine it extracts energy from airflow, not by slowing the air velocity but by causing the flow to rotate. The thermodynamic equations for energy and isoentropic flow show that the change in energy at the turbine has to be a result of both a drop in pressure and temperature of the airflow and it is shown that this temperature drop is enhanced by the rotational parameters within the energy equation. In addition, it is shown that the energy extracted is proportional to the square of the radius of the annular elements from which it is extracted and that when the flow is accelerated to these outer radii by a reduction in area then the forces transferring energy to the turbine rotor blades increase with square of the velocity while the flow angles improve to enhance energy extraction.

The new concept is therefore a wind turbine that comprises:

a.) a forward central portion consisting of a streamlined or parabolic shaped inlet fairing of substantial diameter for the purpose of reducing the flow area by an amount sufficient to cause a significant acceleration of the airflow velocity and at the same time redirecting the airflow to the more effective outer regions of the turbine radii, b.) an aft central portion consisting of a streamlined fairing or streamlined and truncated fairing of a diameter approximately equal to the forward inlet fairing for the purpose of a smooth aerodynamic pressure recovery of the airflow aft of turbine, c.) a plurality of conventional airfoil-shaped rotor blades attached to and extending out from either the forward or the aft fairing whichever rotates and drives a conventional power generation unit, and d.) an outer airfoil-shaped flow control ring with the positive pressure surface of the airfoil oriented towards the center of the turbine and that is attached to the tips of the rotor blades, rotating with the turbine.

Various embodiments of the wind turbines can be built using alternative means for alignment with the wind such as: passive aerodynamically-controlled downwind of tower, passive aerodynamically-controlled upwind of tower with stabilizing vertical tail, or other computer or mechanically controlled versions upwind or downwind.

The airflow entering the wind turbine interacts with the forward inlet fairing and is accelerated to the more effective outer radii of the wind turbine where it is constrained by the airfoil-shaped flow control ring. The control ring serves to prevent rotor tip losses, to inhibit wake expansion, and to promote acceleration of airflow through the turbine resulting in a higher dynamic pressure reacting with the rotor blades, thereby, increasing the overall efficiency and power extraction of the wind turbine.

Furthermore, a methodology for enhanced extraction of thermal energy, performance optimization, and an algorithm for detail design of the wind turbine are disclosed.

Some of the advantages of one or more aspects of the various disclosures are as follows:

a.) The thermodynamic wind turbine design has the ability to perform at higher efficiencies by operating on accepted thermodynamic principles extracting both thermal as well as kinetic energy from the wind, therefore, reducing the temperature of the air flowing through the turbine.

b.) The new turbine design has features that control and inhibit expansion of the downstream wake and minimize the loss in downstream velocity, therefore, reducing the impact on the performance of other wind turbines located downwind in a wind turbine farm.

c.) The various embodiments of the wind turbines are designed with shorter span rotor blades supported at both ends having minimal bending moment acting on the blades. This allows blade construction using less weight in structural materials and in general will allow the fabrication of blades as lightweight shells without massive spar sections.

d.) The outer flow control ring may have the added benefits of reducing noise from the rotor blade tips and reducing the probability of bird strikes.

DETAILED DESCRIPTION OF THE INVENTION

The invention embodies higher efficiency versions of a horizontal axis wind turbine and new fundamental methodologies for the design of wind turbines, which extract both kinetic and thermal energy from the wind.

Figure 1A:
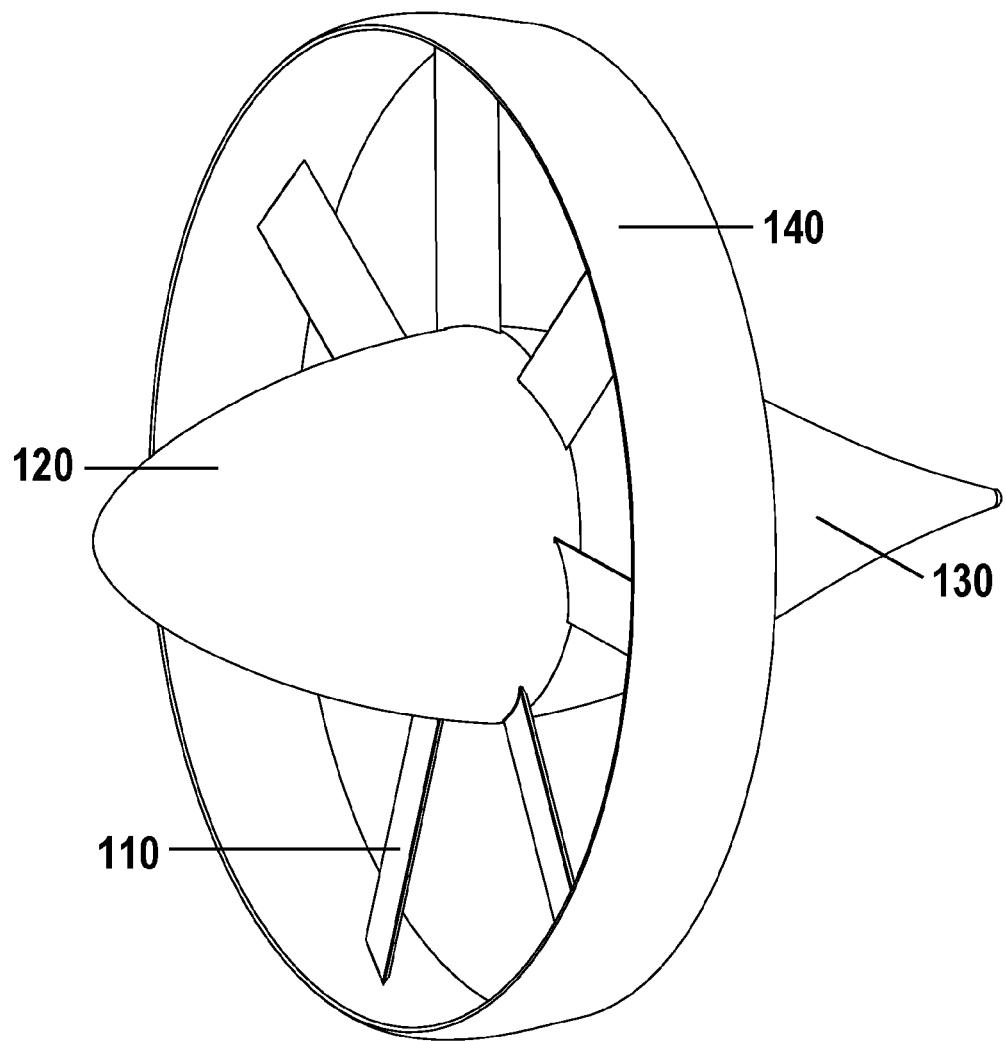
FIG. 1A is a perspective view of one embodiment of the basic thermodynamic wind turbine configuration without a tower depicted.

FIG. 1A shows the basic configuration for the thermodynamic wind turbine without a tower depicted. It is comprised of but not limited to the following components:

a forward central portion consists of a streamlined or parabolic shaped inlet fairing 120; the forward inlet fairing 120 is of a substantial diameter for the purpose of reducing the flow area by an amount sufficient to cause a desired significant acceleration of the airflow velocity and furthermore to redirect the airflow to the more effective outer regions of the turbine radii; the forward inlet fairing 120 is held by an internal means of concentric support and without any external radial supports;

an aft central portion consists of a streamlined fairing or streamlined and truncated fairing 130; the diameter of the aft fairing 130 is approximately equal to the diameter of the forward inlet fairing 120; the aft fairing 130 is held by a separate internal means of concentric support and without any external radial supports, which would disturb rotational motion downstream; the purpose of the aft fairing 130 is to provide for a smooth aerodynamic pressure recovery of the airflow aft of the turbine without any hindrance to rotational flow within the wake;

a plurality of conventional airfoil-shaped rotor blades 110 are attached to and extend out from either the forward or the aft fairing's means of internal support, whichever rotates and drives a conventional power generation unit (not shown); the rotor blades 110 may be either fixed or able to be rotated by some means about their longitudinal axis for airfoil pitch control; and an outer airfoil-shaped flow control ring 140 is attached to the tips of the rotor blades and rotates with the blades; the attachment of the blades to the ring may be either fixed or able to pivot for blade pitch control.

Figure 1B:
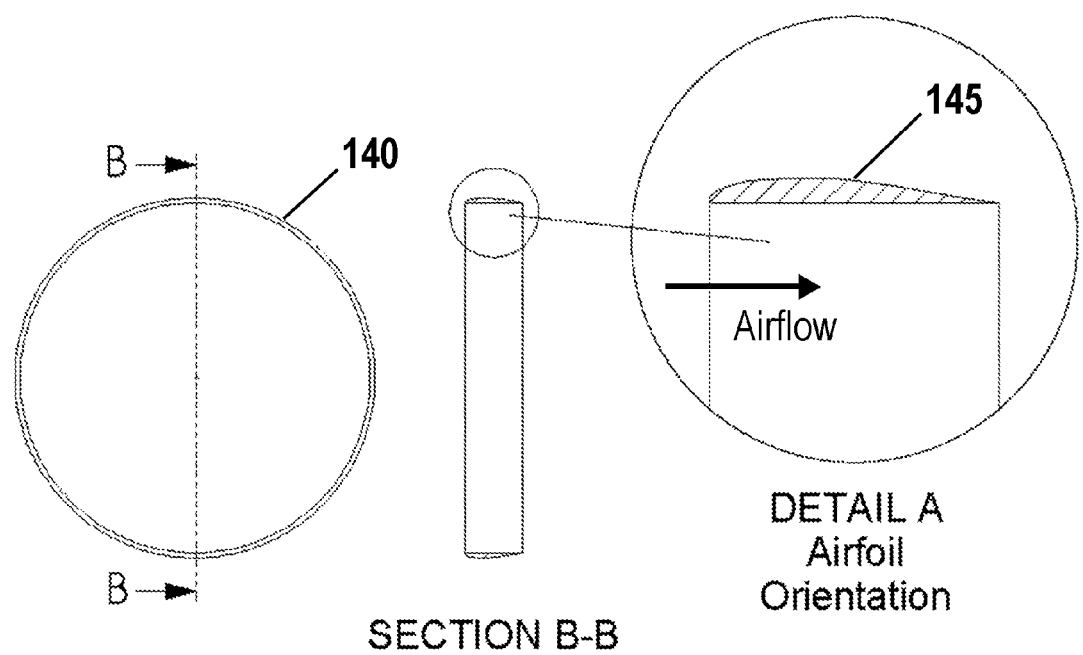
FIG. 1B is a detail view of the flow control ring showing an approximate airfoil cross section of the ring.

FIG. 1B specifically shows an approximate cross section of the airfoil 145 of the flow control ring 140, which is oriented with the positive pressure surface of the airfoil directed towards the center of the turbine; this airfoil orientation is opposite of diffuser designs and operates at a relatively low angle of attack with the purpose of accelerating airflow into the turbine slipstream and inhibiting wake expansion which is opposite of the effect of a diffuser.

Therefore, the airflow entering the wind turbine interacts with both the forward inlet fairing and the outer flow control ring to be accelerated, resulting in a higher dynamic pressure reacting with the rotor blades, while being constrained to the more effective outer radii of the wind turbine. In addition, the airfoil-shaped flow control ring serves to prevent rotor tip losses, to inhibit wake expansion, and to promote acceleration of rotating airflow into the slipstream. The cumulative effect thereby increases the overall efficiency and power extraction of the wind turbine as shown in further details.

Figure 2:
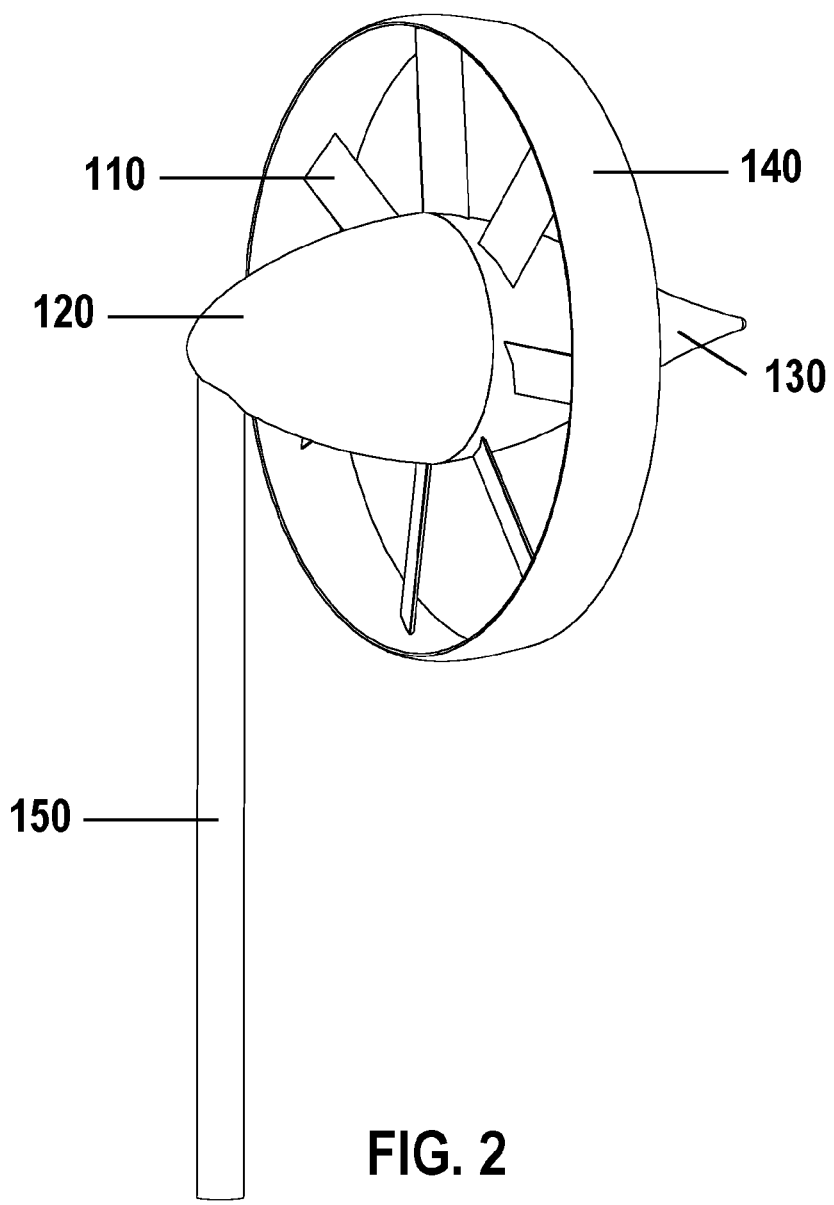
FIG. 2 is a perspective view of one embodiment of a version of the wind turbine mounted downwind of a tower.

FIG. 2 depicts an embodiment of the wind turbine operating downwind of a tower 150. The forward inlet fairing 120 houses the power generation unit and is fixed with the turbine's horizontal axis and attached to the tower 150 by a means that allows the forward inlet fairing 120 to rotate freely about the vertical axis of the tower 150 allowing for the alignment of the wind turbine with the wind. The aft fairing 130 with its means of internal support, the plurality of attached rotor blades 110, and the flow control ring 140 are all free to spin about the horizontal axis of the wind turbine thereby driving the power generation unit.

Figure 3:
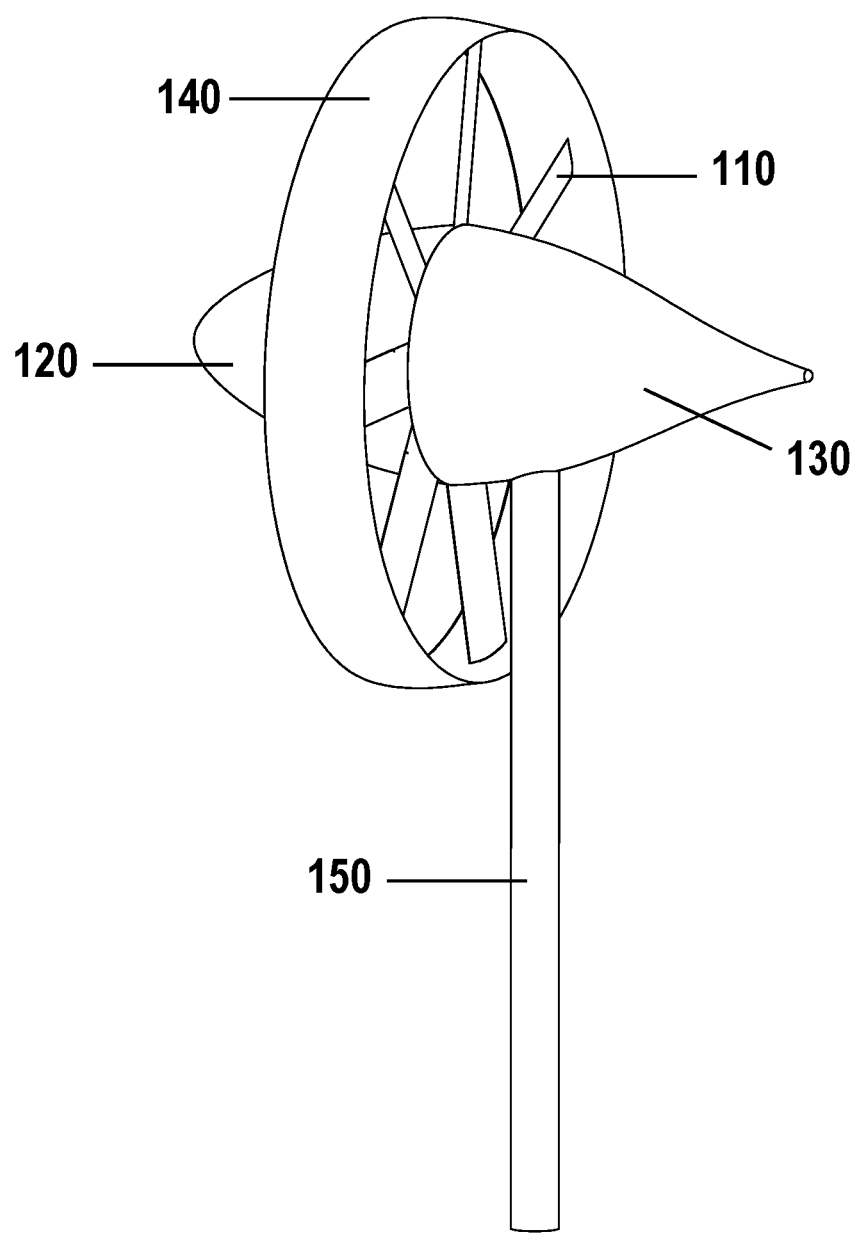
FIG. 3 is a perspective view of one embodiment of a version of the wind turbine mounted upwind of a tower.

FIG. 3 is an embodiment of the wind turbine operating upwind of a tower 150. The aft fairing 130 houses the power generation unit and is fixed with the turbine's horizontal axis and attached to the tower 150 by a means that allows the aft fairing 130 to rotate freely about the vertical axis of the tower 150 allowing for alignment of the turbine with the wind. The forward inlet fairing 120 with its means of internal support, the plurality of attached rotor blades 110, and the flow control ring 140 are all free to spin about the horizontal axis of the wind turbine thereby driving the power generation unit.

Alternately in other embodiments of this wind turbine, the forward or aft fairing may spin; however, it is not required that either spin. Referring back to FIG. 1A, the forward fairing 120 and aft fairing 130 could both be held by a stationary means to a tower such that they are free to rotate together about the vertical axis of the tower. The plurality of rotor blades 110 and flow control ring 140 could rotate between the fairings about a fixed center axis, driving the power generation unit though a means of gearing.

Alternately, both the upwind or downwind embodiments could have stability and passive alignment into the wind, both enhanced with the attachment of a conventional vertical fin or tail extending from the aft fairing.

Figure 4:
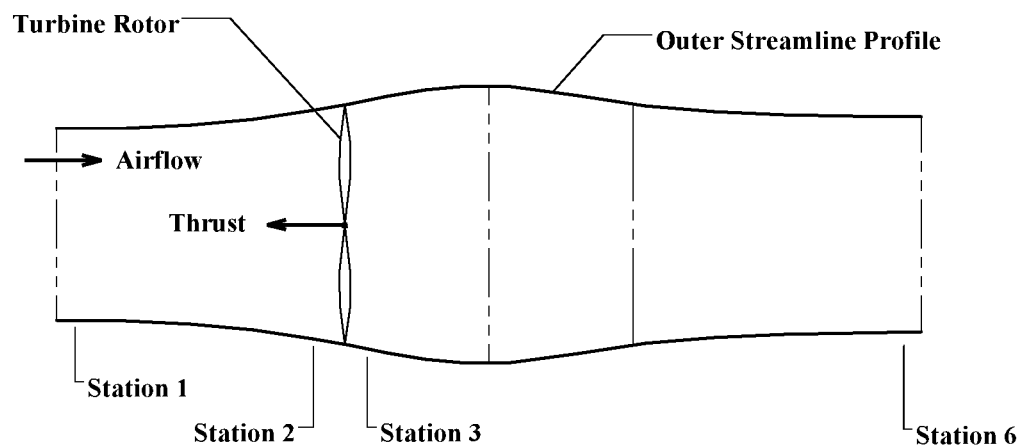
FIG. 4 is a two dimensional drawing of the profile of the stream tube created by a wind turbine showing relative station positions.

Additionally, a methodology for enhanced extraction of thermal energy, performance optimization, and an algorithm for detail design of the wind turbine are disclosed in the following details. In order to understand the further disclosures, it is necessary to be familiar with the new corrected momentum and energy equations used, which are fundamental to the design methodology. The variable subscripts used within these equations refer to the turbine flow field station positions depicted in FIG. 4. Station 1 represents the initial position of turbine influence and Station 6 the final position of influence. Stations 2 and 3 represent positions just forward and aft of the turbine respectively. Stations 4 and 5 are reserved for other discussions.

For the design and analysis of any wind turbine, the first important set of parameters that must be known are the velocity of airflow through the wind turbine $V_2$ and the final velocity of the airflow far downwind $V_6$. Relative to the free stream velocity, these can be defined as inflow velocity ratio, $a_i = V_2/V_1$ and outflow velocity ratio $b_i = V_6/V_1$. Conventional theories typically refer to the less convenient axial induction factor $a = (1-a_i)$. The relationship between the velocity ratios and the thrust or normal force created by the wind turbine is normally derived through Froude's solution of the momentum equation which is equivalent to $$a_i = \tfrac{1}{2}(b_i+1) = \tfrac{1}{2}(1+\sqrt{1-C_T}) \tag{Eq. 1}$$

where $C_T = (F_n/qA)$, $F_n$ is the thrust force of the turbine, q is the dynamic pressure equal to $\rho V_1^2/2$, and A equals the area of the turbine. Equation 1 is a flawed relationship in conventional theory that diverges from real airflow. As can be seen for $C_T>1$, Froude's solution returns unreal values containing the square root of a negative number. Since $C_T$ can vary between 0 and 2, Froude's equations fail to offer valid solutions for the flow variables for the majority of the possible conditions. The methods and embodiments of this invention do not use Froude's solution but instead use the inventor's unique solution called the laminar wake momentum equation, which is equal to:

$$a_i = b_i^2 = (1-0.5C_T)^{2/3}. \tag{Eq. 2}$$

The newly presented Eq. 2 is fundamentally different from previous solutions and is in agreement with both natural observation and empirical data. This equation is essential to the evaluation of the energy equations that are used in the design of all wind turbines.

At this point, conventional theories incorrectly make use of Bernoulli's equation to compare the pressure differential across the wind turbine to the loss in kinetic energy of the final airflow while ignoring rotational parameters. The methodology presented here does not use Bernoulli's equation but instead precedes by defining the rotational terms, which are applied in the total energy equation.

The equation for the power output of a wind turbine is derived from Euler's turbine equation, which can be written as:

$$\dot{W} = \dot{m}\Omega(r_i V_{\theta i} - r_e V_{\theta e}) = \dot{m}\Omega r V_{\theta e}, \tag{Eq. 3}$$

where $\Omega$ is the angular velocity of the turbine, $V_\theta$ represents the tangential velocity of the airflow, which at the turbine inlet is assumed to be zero, and mass flow through the turbine $\dot{m} = \rho V_2 A = \rho a_i V_1 A$. For the design of a wind turbine, the rotor area is discretized into annular elements. For an annular element, $V_{\theta e}$ is equal to $\omega r$, the angular velocity of the slipstream times the radius of the element. The area of the annular element is equal to $2\pi r dr$. This yields the elemental power equation of $$d\dot{W} = 2\pi \rho a_i V_1 \omega \Omega r^3 dr. \tag{Eq. 4}$$

Alternately, the power can be expressed per unit area as $$\frac{d\dot{W}}{dA} = \frac{2\pi \rho a_i V_1 \omega \Omega r^3 dr}{2\pi r dr} = \rho a_i V_1 \omega \Omega r^2 \tag{Eq. 5}$$

or per unit mass flow as $$\frac{d\dot{W}}{d\dot{m}} = \frac{2\pi \rho a_i V_1 \omega \Omega r^3 dr}{2\pi \rho a_i V_1 r dr} = \omega \Omega r^2, \tag{Eq. 6}$$

From Eq. 5, it can be seen that for uniform flow across the turbine area the power extracted increases in equal and direct proportion with inflow velocity ratio, slipstream rotation and turbine rotation. The most prominent variable in Eqs. 5 and 6 is the radius of the annular element r at which the power extraction occurs. The power extraction increases with the square of the radius for the annular element. This is one of the fundamental concepts of the new turbine design and the new methodology. In order to increase the output of the turbine, it is preferred to redirect the air flowing through the turbine from the inner radii to the more effective outer radii.

When the turbine rotor blades react with the airflow, the torque on the blades impart an equal and opposite torque into slipstream causing rotational kinetic energy. The rotational kinetic energy per unit mass of air contained in an annular element of the slipstream is equal to $$ke_{\theta r} = \tfrac{1}{2} \omega^2 r^2 \tag{Eq. 7}$$

We can use the above results to derive the correct total energy equations for the flow through the turbine. The following equations represent the energy balance per unit mass for annular elements between the significant station positions:

$$c_p T_1 + \tfrac{1}{2} V_1^2 = c_p T_2 + \tfrac{1}{2} V_2^2 \tag{Eq. 8}$$

$$c_p T_2 + \tfrac{1}{2} V_2^2 = c_p T_3 + \tfrac{1}{2} V_3^2 + \omega_3 \Omega r_3^2 + \tfrac{1}{2} \omega_3^2 r_3^2 \tag{Eq. 9}$$

$$c_p T_3 + \tfrac{1}{2} V_3^2 + \tfrac{1}{2} \omega_3^2 r_3^2 = c_p T_6 + \tfrac{1}{2} V_6^2 + \tfrac{1}{2} \omega_6^2 r_6^2 \tag{Eq. 10}$$

$$c_p T_1 + \tfrac{1}{2} V_1^2 = c_p T_6 + \tfrac{1}{2} V_6^2 + \tfrac{1}{2} \omega_6^2 r_6^2 + \omega_3 \Omega r_3^2 \tag{Eq. 11}$$

The importance of these equations starts with the understanding of Eq. 9, which represents the energy exchange across the turbine rotor. The continuity of mass flow requires that the velocity of the flow entering and exiting the rotor are the same, $V_2 \approx V_3$. Therefore, from Eq. 9 it can be shown that the energy extracted per unit mass flow is equal to $$\omega_3 \Omega r_3^2 = c_p (T_2 - T_3) - \tfrac{1}{2} \omega_3^2 r_3^2. \tag{Eq. 12}$$

Equation 12 clearly shows that the energy extracted from a wind turbine must be a function of the enthalpy term, which is a function of pressure and temperature in the following equation:

$$c_p(T_2 - T_3) = \left(\frac{p_2}{\rho_2} - \frac{p_3}{\rho_3}\right) + c_v(T_2 - T_3) = \omega_3 \Omega r_3^2 + \frac{1}{2} \omega_3^2 r_3^2. \tag{Eq. 13}$$

These equations explain the thermodynamic process at work as the air passes through the turbine. The energy extracted is shown to be a function of both temperature and pressure; therefore, Bernoulli's equation cannot be used to evaluate the relationships downstream of the wind turbine because the assumed temperature is not constant.

Therefore, the correct energy equation that is valid for the design of the horizontal axis wind turbine, which extracts energy through rotation, can be derived from Eq. 11 yielding $$\omega_3 \Omega r_3^2 = c_p(T_1 - T_6) + \tfrac{1}{2}(V_1^2 - V_6^2) - \tfrac{1}{2} \omega_6^2 r_6^2. \tag{Eq. 14}$$

Multiplying Eq. 14 by mass flow and integrating from r=0 to R yields the total power output of $$\dot{W}_{out} = \tau \Omega = \tfrac{1}{2} \dot{m} \omega_3 \Omega R^2 = \dot{m}[c_p(T_1 - T_6) + \tfrac{1}{2}(V_1^2 - V_6^2) - \tfrac{1}{4} \omega_6^2 R_6^2]. \tag{Eq. 15}$$

From Eq. 15 the final temperature of the flow stream after dissipation of rotational kinetic energy can be found with $$T_f = T_1 + \frac{\tfrac{1}{2}(V_1^2 - V_6^2) - \frac{\tau \Omega}{\dot{m}}}{c_p}. \tag{Eq. 16}$$

The above discussion has introduced the thermodynamic process at work within the wind turbine and has shown that in order to increase the power output, it is necessary to increase the mass flow, the rotational properties of the flow, and furthermore to concentrate the energy extraction process at the outer radii of the turbine. The next step is to analyze the detailed energy transfer that occurs at the rotor blades in order to develop a new blade-element design method.

Conventional methods incorrectly relate the thrust force times velocity to the power extracted, which fails to account for the condition of a free spinning rotor or propeller. When a rotor or propeller is free spinning with no torque applied to its connecting shaft, it is still creating a very significant negative thrust but there is no power exchange other than to frictional losses. The new methodology presented here accounts for this condition with an efficiency factor.

Figure 5:
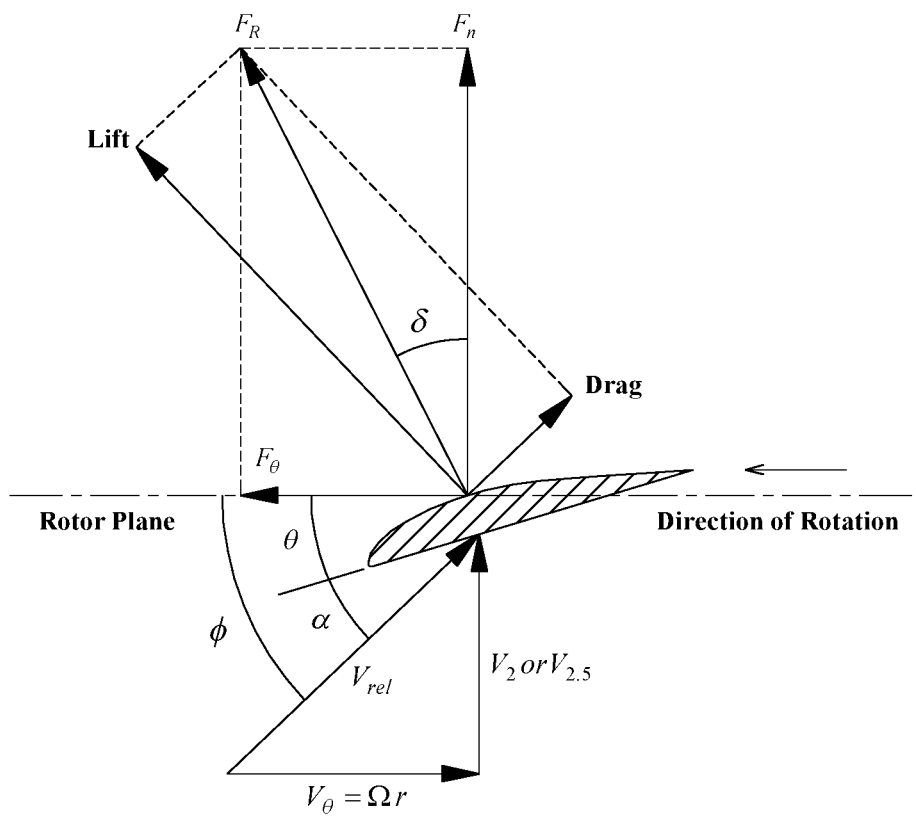
FIG. 5 is a two dimension drawing of the force and velocity triangles relative to a cross section of a blade element.

To derive this new efficiency factor requires an understanding of conventional blade element analysis and the force and velocity triangles relative to the airfoil section of a wind turbine blade. The relative forces and velocities acting on the airfoil section of a wind turbine blade in the outer annular elements of the wind turbine are depicted in FIG. 5; this method puts forth a new way of considering the relationships of these variables. The power entering the turbine can be considered the power available that is equal to the normal force times the velocity through the turbine $F_n V_2$ and the power extracted must be equal to the tangential values, $F_t V_t$ and these terms can be calculated by $$F_n = (L\cos\phi + D\sin\phi) \tag{Eq. 17}$$

$$F_t = (L\sin\phi - D\cos\phi) \tag{Eq. 18}$$

$$\sin\phi = \left(\frac{V_2}{V_{rel}}\right) \tag{Eq. 19}$$

$$\cos\phi = \left(\frac{V_t}{V_{rel}}\right). \tag{Eq. 20}$$

Power available and power extracted can now be defined as $$\text{Power Available} = \dot{W}_{in} = F_n V_2 = \frac{V_2 \Omega r L + V_2^2 D}{V_{rel}} \tag{Eq. 21}$$

$$\text{Power Extracted} = \dot{W}_{out} = F_t V_t = \frac{V_2 \Omega r L - (\Omega r)^2 D}{V_{rel}} \tag{Eq. 22}$$

The efficiency factor can now be derived as $$\eta_T = \frac{\dot{W}_{out}}{\dot{W}_{in}} = \frac{V_2 \Omega r L - (\Omega r)^2 D}{V_2 \Omega r L + V_2^2 D}. \tag{Eq. 23}$$

Dividing all terms through by $DV_1^2$ yields $$\eta_T = \frac{a_i \lambda_r \left(\frac{L}{D}\right) - \lambda_r^2}{a_i \lambda_r \left(\frac{L}{D}\right) + a_i^2} \tag{Eq. 24}$$

Equation 24 leaves the efficiency in terms of all non-dimensional parameters, where $\lambda_r$ is the local rotational speed ratio equal to $(\Omega r)/V_1$ and L/D is the lift to drag ratio for the local airfoil element. Equation 24 can be further simplified to $$\eta_T = \frac{\frac{L}{D} - \frac{\lambda_r}{a_i}}{\frac{L}{D} + \frac{a_i}{\lambda_r}}. \quad \text{(Eq. 25)}$$

Important findings that are not covered with conventional methods can be noted from Eqs. 24 and 25. The efficiency is lower for higher values of $\lambda_r$; in fact, the maximum efficiency occurs at $(\lambda_r/a_i) \sim 1$, which implies $\tan \varphi \sim 1$ or in other words the optimum relative flow angle to the rotor blades would be approximately 45 degrees. Also if $(\lambda_r/a_i) = (L/D)$, then the efficiency for extracting power goes to zero, which precisely explains the case for the free-spinning turbine.

Now that a relationship has been derived for the efficiency of the turbine blade elements, it can carry forward into an equation for power coefficient. By convention, power coefficient $C_P$ is defined as the power extracted by the turbine divided by the theoretical power contained in the kinetic energy of the free stream or $$C_P = \frac{\dot{W}_{out}}{qV_1A_2}. \quad \text{(Eq. 26)}$$

From Eqs. 21 and 23, $$\dot{W}_{out} = \eta_T \dot{W}_{in} = \eta_T F_n V_2, \quad \text{(Eq. 27)}$$

Eq. 27 into Eq. 26 yields $$C_P = \frac{\eta_T F_n V_2}{qV_1A_2} = \eta_T a_i C_T, \quad \text{(Eq. 28)}$$

and from Eq. 2, $C_T = 2(1-a_i^{1.5})$ can be inserted into Eq. 28 yielding a new relationship for the power coefficient for an open rotor turbine of $$C_P = 2\eta_T a_i (1 - a_i^{1.5}). \quad \text{(Eq. 29)}$$

Although efficiency is also a function of $\lambda_r/a_i$, it is independent of power available and approaches unity for high L/D ratios. Therefore, we can maximize the $C_P$ equation by taking the derivative with respect to $a_i$ and setting equal to zero while holding $\eta_T$ constant yielding $$\frac{dC_P}{da_i} = \eta_T(2 - 5a_i^{1.5}) = 0. \quad \text{(Eq. 30)}$$

Solving Eq. 30 yields an optimum of $a_i \approx 0.543$ and $C_{Pmax} \approx 0.651 \eta_T$. This result is of major importance; that is, the realization that the optimum inflow-velocity ratio should be $a_i \approx 0.543$ and not the value of 0.667 that other conventional design methods call out. The implication of this and the new efficiency factor is to promote higher-loaded, slower-turning multi-bladed designs to the forefront.

Figure 6:
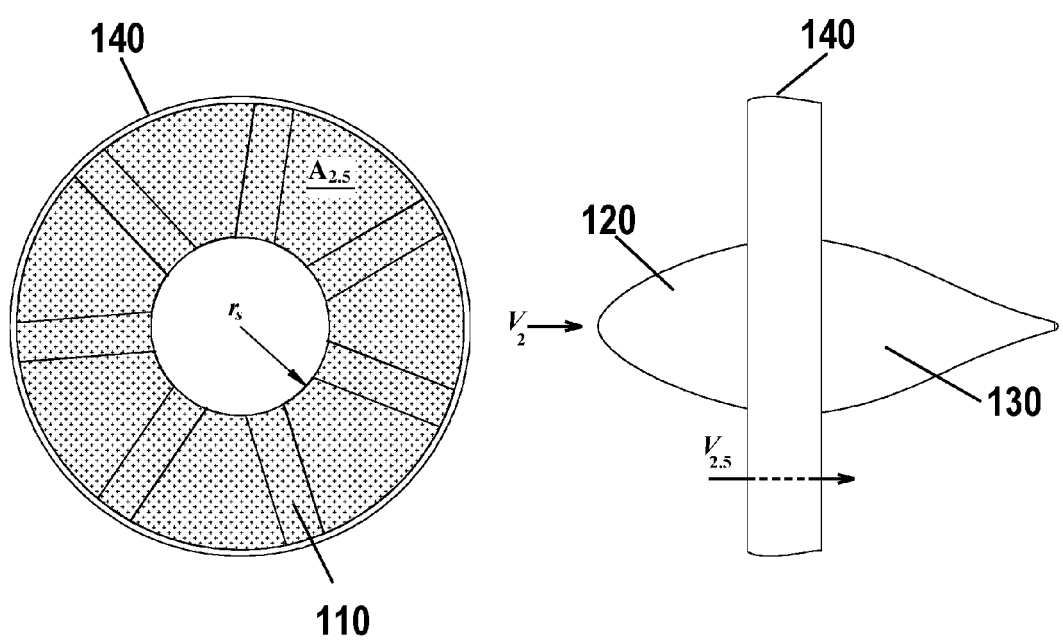
FIG. 6 is a front and side view projection of a thermodynamic wind turbine showing the necessary relative dimensions, areas and velocities required to calculate the accelerated airflow used in the detail design of the thermodynamic wind turbine.

It is known from Eq. 27 that the power out is equal to $\eta_T F_n V_2$; therefore, in order to extract more power from the wind one must either increase the efficiency or increase the power available $F_n V_2$. However, $F_n$ cannot be increased beyond the value of $C_T = (F_n/qA)$, which returns the optimum value of $a_i \approx 0.543$ determined from Eq. 2 without adversely affecting mass flow. $V_2$ can be increased and this leads to the accelerated flow concept. When flow is constrained through a low-drag area-reduction between Station 2 and the wind turbine, the flow is naturally accelerated to a higher velocity. This process, as used by the present invention, is shown in FIG. 6 where $r_s$ is the radius of the inlet fairing and $V_{2.5}$ is the accelerated velocity. Continuity of mass flow requires that $V_2 A_2 = V_{2.5} A_{2.5}$. Solving for areas as a function of radius and manipulating terms yields $$V_{2.5} = \frac{a_i V_1}{1 - \left(\frac{r_s}{R}\right)^2}. \quad \text{(Eq. 31)}$$

A new acceleration factor can be defined by $$a_s = \frac{1}{1 - \left(\frac{r_s}{R}\right)^2}. \quad \text{(Eq. 32)}$$

This then allows defining $$V_{2.5} = a_s V_2 = a_s a_i V_1. \quad \text{(Eq. 33)}$$

This velocity increase simultaneously increases the kinetic energy and power available within the flow field, dropping the temperatures and increasing the efficiency of the system due to improved flow angles at the rotor and higher dynamic pressures reacting with the rotor blades. This new velocity term can be used to derive a new efficiency term for constrained flow with an area reduction equal to $$\eta_{Ts} = \frac{\frac{L}{D} - \frac{\lambda_r}{a_i a_s}}{\frac{L}{D} + \frac{a_i a_s}{\lambda_r}}. \quad \text{(Eq. 34)}$$

From Eq. 34, it can be shown that efficiency goes up with acceleration factor. Simultaneously, this makes the new power available term equal to $F_n V_{2.5}$ and we can conclude a new equation for power coefficient of $$C_P = \frac{2\eta_{Ts} a_i (1 - a_i^{1.5})}{1 - \left(\frac{r_s}{R}\right)^2} = 2\eta_{Ts} a_s a_i (1 - a_i^{1.5}). \quad \text{(Eq. 35)}$$

The maximum value of $C_P$ for the accelerated flow thermodynamic wind turbine does not yield a readily available solution. As the area reduction approaches unity, the acceleration factor goes to infinity. In reality, as the drag of the forward inlet fairing, the flow control ring and intersection drag increase, they must be accounted for as they will eventually overwhelm the flow through the turbine decreasing mass flow to zero. This can be accounted for by including a function for the coefficient of drag $C_D$ equal to $$C_D = \frac{(D_C + D_O + D_I)}{qA}, \quad \text{(Eq. 36)}$$

where $D_C$, $D_O$, and $D_I$ are the drag forces of the center area reduction fairings, the outer flow control ring, and intersection drag respectfully. This allows for a more accurate laminar wake momentum equation for constrained flow of $$a_i = b_i^2 = [1-0.5(C_T+C_D)]^{2/3}. \quad \text{(Eq. 37)}$$

Equation 37 should also be valid in the analysis of diffusers and other augmented flow designs. The important factor to note here is that the efficiency of flow devices to extract power from their normal force is zero. Therefore, this must be deducted from the power coefficient leaving the final new equation for power coefficient of a constrained flow turbine as $$C_P = \eta_{TS} a_s a_i C_T = \eta_{TS} a_s a_i [2(1-a_i^{1.5}) - C_D]. \quad \text{(Eq. 38)}$$

One of the keys to making this wind turbine effective is the performance analysis and detail design of the rotor blades using a corrected algorithm that accounts for the new solution to the momentum equation and for the additional energy, which can be extracted from the accelerated flow. The basic algorithm steps for analyzing the turbine's performance are as follows:

Step 1.) Choose an applicable wind velocity $V_1$ and initialize an assumed value for inflow velocity ratio $a_i = V_2/V_1$. The optimum value for $a_i$ should be approximately 0.54.

Step 2.) Calculate $V_2$, the minimum velocity that the airflow is slowed to as it approaches the turbine using the formula $$V_2 = a_i V_1$$

and calculate $V_{2.5}$, the maximum velocity the airflow reaches as it passes through the turbine based on the size of the forward inlet fairing using the formula $$V_{2.5} = a_s a_i V_1 = \frac{a_i V_1}{1-\left(\frac{r_s}{R}\right)^2};$$

Step 3.) Discretize the flow field into annular elements and layout for each annular element: the number of rotor blades, planform, airfoil chord, pitch angle θ, and rotor velocity Ωr. Compute the relative velocity, $$V_{rel} = \sqrt{(V_{2.5}^2 + \Omega^2 r^2)},$$

the inflow angle $$\varphi = \tan^{-1}(V_{2.5}/\Omega r),$$

and local angle of attack $$\alpha = (\varphi - \theta).$$

Step 4.) Using calculations from Step 3 in combination with known airfoil data or airfoil design software, determine local lift coefficient $c_l$ and drag coefficient $c_d$ for each blade element.

Step 5.) Using calculations from Step 3 and results from Step 4, calculate the normal forces on each blade element using standard methods of blade element analysis.

Step 6.) Sum all the elemental blade normal forces, computing a total rotor normal force $F_n$ and calculate the thrust coefficient $C_T = F_n/(qA)$. Then estimate $D_C$, $D_O$, and $D_I$ and calculate $C_D$ for the non-power extracting flow devices from the formula $$C_D = \frac{(D_C + D_O + D_I)}{qA},$$

and from these results, calculate the corrected value for $a_i$ using $$a_i = [1-0.5(C_T+C_D)]^{2/3}.$$

Step 7.) Compare the result for $a_i$ from Step 6 with initialized value and iterate Steps 1 through 6 until the final value of $a_i$ is in reasonable agreement with the initialized value. The optimum value of the inflow velocity ratio $a_i$ is configured through the aforementioned parameters to be equal to approximately 0.54.

Step 8.) Calculate differential pressure for each annular element by dividing the elemental blade normal forces by the elemental areas and confirm that these values are reasonably close; if not, adjust chord or pitch angle to maintain reasonably uniform pressure differential between the elements which implies a uniform flow field. Iterate Steps 1 through 8 until $a_i$ is in reasonable agreement with the initialized value and the differential pressures between the annular elements are in reasonable agreement representing uniform flow.

Step 9.) Calculate the normal and tangential forces on each blade element using standard methods of blade element analysis. From these results, compute the total loads and moments on all the rotor blades. Finally, calculate the turbine power and thrust using standard methods.

The thermodynamic wind turbine and the design methodologies described above are innovations to the horizontal axis wind turbine, which yield higher efficiencies than those previously achieved or thought to be practical. These higher efficiencies are shown from the corrected momentum and energy equations to be the result of a naturally occurring extraction of thermal energy as well as kinetic energy from the wind, therefore reducing the temperature of the air flowing through the turbine. The design methodologies can be easily implemented by those in the engineering fields. The various configurations have the structural advantage of smaller shorter span rotor blades supported at both ends and therefore requiring less weight in structural materials. The various turbine components can be fabricated from any suitable material by those skilled in the art. The basic configurations described have the added benefits of reducing the expansion of the wake and minimizing the loss in the air velocity downwind of the turbine therefore reducing the impact on other turbines in a wind turbine farm. The outer flow control ring may have the added benefit of reducing noise from the rotor and reducing the probability of bird strikes.

As described, the thermodynamic wind turbine is commercially applicable for the conversion of wind energy to electrical energy but is not limited to this. Further embodiments of the invention could also be used for the conversion of wind energy to mechanical energy such as for pumping or compressing operations. The scope of the invention to be protected is as defined in the claims and it is expressly intended that all such variations and changes, which fall within the spirit and scope as defined within the claims, are thereby included.

NOMENCLATURE

The following nomenclature is necessary to understand certain embodiments of the invention:

A=swept area of rotor
a=axial induction factor, $a=(V_1-V_2)/V_1$
$a_i$=inflow velocity ratio, $a_i=V_2/V_1=(1-a)$
b=axial slipstream factor, $b=(V_1-V_6)/V_1$
$b_i$=outflow velocity ratio, $b_i=V_6/V_1=(1-b)$
$C_D$=drag coefficient $C_D=D/(qA)$
$C_P$=power coefficient $C_P=\dot{W}_{out}/(qV_1A)$
$C_T$=thrust coefficient $C_T=F_n/(qA)$
c=chord, local blade
$c_d$=drag coefficient for a section, uppercase for a surface
$c_l$=lift coefficient for a section, uppercase for a surface
$c_p$=specific heat at constant pressure
$c_v$=specific heat at constant volume
D=drag force of blade element
$D_C$=drag force of center area reduction fairings
$D_I$=intersection drag forces
$D_O$=drag force of the outer flow control ring
e=energy per unit mass
F=force
h=enthalpy per unit mass
ke=kinetic energy per unit mass
$ke_{\theta,r}$=rotational kinetic energy per unit mass for an annular element
L=lift force of blade element
$\dot{m}$=mass flow $\dot{m}=\rho VA$
p=pressure
q=dynamic pressure $q=(\rho V_1^2)/2$
R=maximum radius of turbine when no subscript is present
r=local or relative radius of blade element
$r_s$=radius of the inlet fairing
T=temperature
$V_1$=velocity of the free stream unaffected by the turbine
$V_2$=minimum velocity the airflow is slowed to, upwind of the turbine
$V_{2.5}$=maximum velocity the airflow achieves as it passes through the turbine
$V_3$=velocity or the airflow immediately downwind of the turbine
$V_6$=final velocity of the airflow far down wind of the turbine
$V_\theta$=tangential velocity of airflow aft of the rotor $V_\theta=\omega r$
$V_t$=tangential velocity of turbine blade element $V_t=\Omega r$
W=work or energy
$\dot{W}$=power, work per unit time
$\alpha$=airfoil relative angle of attack
$\eta_T$=efficiency of an open rotor turbine element
$\eta_{Ts}$=efficiency of a constrained flow turbine element
$\theta$=pitch angle of rotor blade
$\lambda$=tip speed ratio, $\lambda=\Omega R/V_1$, $\lambda_R$ may also be used
$\lambda_r$=local speed ratio, $\lambda_r=\Omega r/V_1$
$\rho$=density of the air
$\tau$=torque
$\varphi$=angle between rotor plane and relative flow velocity
$\Omega$=angular velocity of turbine
$\omega$=angular velocity of slipstream

Subscripts e=exit
f=final
i=initial or inlet
n=normal or perpendicular to rotor disc
r=with respect to an annular element located at radius r
rel=relative to the airfoil
t=tangentially to rotor disc

What is claimed is:

1. A horizontal axis wind turbine comprising:
a forward central portion including a streamlined inlet fairing attached to a tower but free to rotate about the vertical axis of said tower allowing for alignment of said wind turbine with the wind, the purpose of said inlet fairing is for reducing the flow area thereby causing an acceleration of the airflow velocity and furthermore redirecting the airflow to the more effective outer radii of the wind turbine;
an aft central portion including an aft streamlined fairing of a diameter approximately equal to said forward inlet fairing, the purpose of which is to provide for a smooth aerodynamic pressure recovery of the airflow aft of the wind turbine;
a plurality of conventional airfoil-shaped rotor blades attached to and extending radially out from said aft streamlined fairing all of which are free to rotate about the horizontal axis of the wind turbine; and
an outer airfoil-shaped flow control ring with the lower pressure (suction) side of the airfoil oriented to the outside of the ring and the higher (positive) pressure side of the airfoil forming the inner surface of the ring which is attached to the tips of and rotating with said rotor blades;
whereby the airflow entering the wind turbine is accelerated and therefore of higher dynamic pressure to react with said rotor blades and furthermore the airflow is constrained at the more effective outer radii of the wind turbine and accelerated into the aft slipstream causing an increase in the slipstream rotation thereby increasing the overall efficiency and power extraction of the wind turbine;
wherein the power coefficient of the wind turbine is maximized based on the following equality:

$$C_P=\eta_{Ts}a_s a_i[2(1-a_i^{1.5})-C_D],$$

where
$C_p$ is the power coefficient defined as $$C_P = \frac{\dot{W}_{out}}{qV_1 A_2},$$

where
$\dot{W}_{out}$ is the power extracted by the wind turbine,
$\rho$ is the density of the air,
$V_1$ is the free stream velocity of the airflow,
A is the area swept by the wind turbine,
$V_2$ is the minimum velocity of the airflow as it approaches the wind turbine,
$a_i$ is the inflow velocity ratio equal to $V_2/V_1$, which is evaluated by the equality $$a_i=[1-0.5(C_T+C_D)]^{2/3},$$

where
$C_T$ is the thrust coefficient equal to $F_n/(qA)$,
$C_D$ is the drag coefficient equal to $(D_C+D_O+D_I)/(qA)$
$F_n$ is the total normal force acting on said rotor blades,
$D_C$ is the combined drag force of said forward inlet and said aft streamlined fairings,
$D_O$ is the drag force of said outer flow control ring,
$D_I$ is the accumulated intersection drag of said rotor blades,
q is the dynamic pressure of the airflow equal to $\rho V_1^2/2$, $\eta_{Ts}$ is the efficiency at a given annular element of said rotor blades,
which is evaluated by the equality $$\eta_{Ts} = \frac{\frac{L}{D} - \frac{\lambda_r}{a_i a_s}}{\frac{L}{D} + \frac{a_i a_s}{\lambda_r}},$$

where

L/D is equal to the local lift to drag ratio at a given annular element of said rotor blades, $\lambda_r$ is equal to the local speed ratio at a given annular element of said rotor blades which is defined as $\lambda_r = \Omega r / V_1$, r is the local radius of the given annular element of said rotor blades, $\Omega$ is the angular velocity of said rotor blades, $a_s$ is the flow acceleration factor evaluated by the equality $$a_s = \frac{1}{1 - \left(\frac{r_s}{R}\right)^2},$$

where $r_s$ is the outer radius of said streamlined inlet fairing, and
R is the inner radius of said outer flow control ring.

2. A horizontal axis wind turbine according to claim 1, wherein said rotor blades are furthermore configured to produce a thrust coefficient, $C_T$ equal to 1.20+/−10%, in order to achieve an optimum inflow velocity ratio, $a_i$ equal to 0.54+/−10%.

3. A horizontal axis wind turbine comprising:
a forward central portion including a streamlined inlet fairing for the purpose of reducing the flow area thereby causing an acceleration of the airflow velocity while furthermore redirecting the airflow to the more effective outer radii of the wind turbine;
a plurality of conventional airfoil-shaped rotor blades attached to and extending radially out from said forward inlet fairing all of which are free to rotate about the horizontal axis of the wind turbine;
an aft central portion including an aft streamlined fairing of a diameter approximately equal to said forward inlet fairing and which is attached to a tower but free to rotate about the vertical axis of said tower allowing for alignment of the wind turbine with the wind, the purpose of said aft streamlined fairing is to provide for a smooth aerodynamic pressure recovery of the airflow aft of the wind turbine; and
an outer airfoil-shaped flow control ring with the lower pressure (suction) side of the airfoil oriented to the outside of the ring and the higher (positive) pressure side of the airfoil forming the inner surface of the ring which is attached to the tips of and rotating with said rotor blades;
whereby the airflow entering the wind turbine is accelerated and therefore of higher dynamic pressure to react with said rotor blades and furthermore the airflow is constrained at the more effective outer radii of the wind turbine and accelerated into the aft slipstream causing an increase in the slipstream rotation thereby increasing the overall efficiency and power extraction of the wind turbine;

wherein the power coefficient of the wind turbine is maximized based on the following equality:

$$C_P = \eta_{Ts} a_s a_i [2(1 - a_i^{1.5}) - C_D],$$

where $C_P$ is the power coefficient defined as $$C_P = \frac{\dot{W}_{out}}{qV_1 A_2},$$

where $\dot{W}_{out}$ is the power extracted by the wind turbine,
$\rho$ is the density of the air,
$V_1$ is the free stream velocity of the airflow,
A is the area swept by the wind turbine,
$V_2$ is the minimum velocity of the airflow as it approaches the wind turbine,
$a_i$ is the inflow velocity ratio equal to $V_2/V_1$, which is evaluated by the equality $$a_i = [1 - 0.5(C_T + C_D)]^{2/3},$$

where $C_T$ is the thrust coefficient equal to $F_n/(qA)$,
$C_D$ is the drag coefficient equal to $(D_C + D_O + D_I)/(qA)$
$F_n$ is the total normal force acting on said rotor blades,
$D_C$ is the combined drag force of said forward inlet and said aft streamlined fairings,
$D_O$ is the drag force of said outer flow control ring,
$D_I$ is the accumulated intersection drag of said rotor blades,
q is the dynamic pressure of the airflow equal to $\rho V_1^2/2$,
$\eta_{Ts}$ is the efficiency at a given annular element of said rotor blades,
which is evaluated by the equality $$\eta_{Ts} = \frac{\frac{L}{D} - \frac{\lambda_r}{a_i a_s}}{\frac{L}{D} + \frac{a_i a_s}{\lambda_r}},$$

where

L/D is equal to the local lift to drag ratio at a given annular element of said rotor blades, $\lambda_r$ is equal to the local speed ratio at a given annular element of said rotor blades which is defined as $\lambda_r = \Omega r / V_1$, r is the local radius of the given annular element of said rotor blades, $\Omega$ is the angular velocity of said rotor blades, $a_s$ is the flow acceleration factor evaluated by the equality $$a_s = \frac{1}{1 - \left(\frac{r_s}{R}\right)^2},$$

where $r_s$ is the outer radius of said streamlined inlet fairing, and
R is the inner radius of said outer flow control ring.

4. A horizontal axis wind turbine according to claim 3, wherein said rotor blades are furthermore configured to produce a thrust coefficient, $C_T$ equal to 1.20+/−10%, in order to achieve an optimum inflow velocity ratio, $a_i$ equal to 0.54+/−10%.

* * * * *